(12) United States Patent
Prevoir et al.

(10) Patent No.: US 10,448,183 B2
(45) Date of Patent: Oct. 15, 2019

(54) METHOD OF FABRICATING A MINIATURE DEVICE HAVING AN ACOUSTIC DIAPHRAGM

(71) Applicant: Bose Corporation, Framingham, MA (US)

(72) Inventors: Shawn Prevoir, Northborough, MA (US); Prateek Nath, Southborough, MA (US)

(73) Assignee: BOSE CORPORATION, Framingham, MA (US)

( * ) Notice: Subject to any disclaimer, the term of this patent is extended or adjusted under 35 U.S.C. 154(b) by 87 days.

(21) Appl. No.: 15/661,155

(22) Filed: Jul. 27, 2017

(65) Prior Publication Data

US 2019/0037330 A1    Jan. 31, 2019

(51) Int. Cl.
*H04R 25/00* (2006.01)
*H04R 31/00* (2006.01)
(Continued)

(52) U.S. Cl.
CPC ........... *H04R 31/003* (2013.01); *B29C 48/03* (2019.02); *B29C 48/08* (2019.02); *B29C 48/154* (2019.02); *B29C 48/78* (2019.02); *B29C 65/028* (2013.01); *B29C 66/112* (2013.01); *B29C 66/114* (2013.01); *B29C 66/5346* (2013.01); *B29C 66/71* (2013.01); *B29C 66/731* (2013.01);
(Continued)

(58) Field of Classification Search
CPC .......... H04R 31/003; H04R 7/04; H04R 7/18; H04R 9/06; B29C 47/0009; B29C 47/78
USPC .................................. 381/410, 398
See application file for complete search history.

(56) References Cited

U.S. PATENT DOCUMENTS 2,657,758 A * 11/1953 Varnet .................... H04R 9/045
                                                    181/164
3,851,037 A    11/1974 Day et al.
(Continued)

FOREIGN PATENT DOCUMENTS

DE          533786 C      9/1931
DE       10303247 A1      8/2004

OTHER PUBLICATIONS

International Search Report and Written Opinion in International Patent Application No. PCT/US18/28788, dated Jun. 25, 2018; 16 pages.
(Continued)

*Primary Examiner* — Phylesha Dabney
(74) *Attorney, Agent, or Firm* — Schmeiser, Olsen & Watts LLP; William G. Guerin

(57) ABSTRACT

A method of forming a device having a compliant member includes applying heat to a thermoplastic elastomer to maintain the thermoplastic elastomer in a softened state. The thermoplastic elastomer is extruded in the softened state as a film of thermoplastic elastomer. One or more of a bobbin and a housing, each having and end, is positioned such that the end extends at least partially into the film of thermoplastic elastomer. The positioning occurs when the thermoplastic elastomer is in the softened state and/or the bobbin and/or housing is at a temperature that is greater than a temperature of the film of thermoplastic elastomer. The film is cooled so that the bobbin and/or housing are secured to the film and so that the thermoplastic elastomer is in a state that exhibits rubber-like properties.

22 Claims, 8 Drawing Sheets

(51) Int. Cl.
  *B29C 48/03* (2019.01)
  *B29C 48/78* (2019.01)
  *H04R 7/04* (2006.01)
  *H04R 7/18* (2006.01)
  *H04R 9/06* (2006.01)
  *B29C 65/00* (2006.01)
  *B29C 65/02* (2006.01)
  *B29C 48/08* (2019.01)
  *B29C 48/154* (2019.01)
  *B29L 31/34* (2006.01)
  *B29L 31/00* (2006.01)
  *B29K 105/20* (2006.01)

(52) U.S. Cl.
  CPC ...... *B29C 66/742* (2013.01); *B29C 66/91943* (2013.01); *H04R 7/04* (2013.01); *H04R 7/18* (2013.01); *H04R 9/06* (2013.01); *B29C 66/73115* (2013.01); *B29C 66/73117* (2013.01); *B29C 66/74283* (2013.01); *B29C 66/919* (2013.01); *B29K 2105/203* (2013.01); *B29K 2995/007* (2013.01); *B29L 2031/3418* (2013.01); *B29L 2031/3481* (2013.01); *B29L 2031/704* (2013.01); *H04R 2231/001* (2013.01)

(56) References Cited

U.S. PATENT DOCUMENTS

| | | | | |
|---|---|---|---|---|
| 4,088,847 | A * | 5/1978 | Yukimoto | H04R 9/046 381/400 |
| 4,395,598 | A | 7/1983 | Lesage | |
| 4,410,768 | A | 10/1983 | Nakamura et al. | |
| 4,817,165 | A | 3/1989 | Amalaha | |
| 5,472,736 | A * | 12/1995 | Barr | G11B 5/313 427/123 |
| 5,566,242 | A | 10/1996 | Hall | |
| 6,757,404 | B2 * | 6/2004 | Takewa | H04R 7/12 181/174 |
| 8,107,665 | B2 | 1/2012 | Happapuro et al. | |
| 9,049,511 | B2 | 6/2015 | Shen | |
| 9,888,306 | B2 | 2/2018 | Worrell et al. | |
| 9,955,266 | B2 | 4/2018 | Liu et al. | |
| 2006/0062422 | A1 | 3/2006 | Ono et al. | |
| 2006/0266577 | A1 | 11/2006 | Inoue et al. | |
| 2011/0317869 | A1 | 12/2011 | Fujitani et al. | |
| 2012/0018611 | A1 | 1/2012 | Ishii et al. | |
| 2012/0263338 | A1 | 10/2012 | Hori et al. | |
| 2013/0279729 | A1 | 10/2013 | Richards | |
| 2014/0241565 | A1 | 8/2014 | Jin | |
| 2015/0312660 | A1 | 10/2015 | Lembacher et al. | |
| 2015/0326975 | A1 | 11/2015 | Takada | |
| 2016/0121814 | A1 | 5/2016 | Foss et al. | |
| 2016/0185036 | A1 | 6/2016 | Yamasaki et al. | |
| 2017/0078800 | A1 | 3/2017 | Guthy et al. | |
| 2017/0129143 | A1 | 5/2017 | Otto et al. | |
| 2017/0359657 | A1 | 12/2017 | Bushko et al. | |
| 2018/0338207 | A1 * | 11/2018 | Nath | H04R 9/06 |

OTHER PUBLICATIONS

"How to make silicone molds," Colorful-crafts.com, Jun. 23, 2016.
Final Office Action in U.S. Appl. No. 15/182,069, dated Oct. 11, 2017; 9 pages.
U.S. Appl. No. 15/182,069, filed Jun. 14, 2016; 20 pages.
U.S. Appl. No. 15/598,065, filed May 17, 2017; 28 pages.
Restriction Requirement in U.S. Appl. No. 15/182,069, dated Jun. 8, 2017; 5 pages.
Non-Final Office Action in U.S. Appl. No. 15/182,069, dated Jul. 6, 2017; 12 pages.
International Search Report & Written Opinion in International Patent Application No. PCT/US17/033283, dated Aug. 11, 2017; 15 pages.
International Search Report and Written Opinion in PCT/US2018/039281 dated Oct. 2, 2018; 14 pages.
International Preliminary Report on Patentability in PCT/US2017/033283 dated Dec. 27, 2018; 10 pages.
Non-Final Office Action in U.S. Appl. No. 15/598,065, dated Jan. 28, 2019; 13 pages.
Notice of Allowance and Fees Due in U.S. Appl. No. 15/875,866, dated Feb. 4, 2019; 10 pages.
Notice of Allowance in U.S. Appl. No. 15/182,069 dated Sep. 19, 2017; 11 pages.

* cited by examiner

METHOD OF FABRICATING A MINIATURE DEVICE HAVING AN ACOUSTIC DIAPHRAGM

BACKGROUND

This disclosure relates to a miniature device having a compliant member. More particularly, the disclosure relates to a method of fabricating an acoustic diaphragm on the miniature device.

SUMMARY

In one aspect, a method of fabricating a device having a complaint member includes applying heat to a thermoplastic elastomer to maintain the thermoplastic elastomer in a softened state. The thermoplastic elastomer is extruded in the softened state into a film of thermoplastic elastomer. One or more of a bobbin and a housing, each having and end, are positioned such that the end of the bobbin and/or housing extends at least partially into the film of thermoplastic elastomer. The positioning occurs when the thermoplastic elastomer is in the softened state and/or the bobbin and/or housing is at a temperature that is greater than a temperature of the film of thermoplastic elastomer. The film of thermoplastic elastomer having the bobbin positioned therein is cooled so that the bobbin and/or housing are thereby secured to the film of thermoplastic elastomer.

Examples may include one or more of the following features:

Extruding the thermoplastic elastomer may include extruding the thermoplastic elastomer as a film on a release liner. The release liner may be removed from the film of thermoplastic elastomer subsequent to the cooling of the film of thermoplastic elastomer.

The film of thermoplastic elastomer may be cooled into a rubber state and heat may be applied to the film of thermoplastic elastomer in the rubber state to change the film of thermoplastic elastomer into the softened state prior to the positioning of the housing.

The temperature of the film of thermoplastic elastomer may be at an ambient temperature when the housing is at a temperature that is greater than the temperature of the film of thermoplastic elastomer.

A portion of the film of thermoplastic elastomer that extends outside a diameter of the housing may be removed after cooling the film of thermoplastic elastomer.

The thermoplastic elastomer may include a thermoplastic vulcanizate. Applying heat to the thermoplastic vulcanizate to maintain the thermoplastic vulcanizate in a softened state may include heating the thermoplastic vulcanizate to greater than a crystalline melting temperature of a polypropylene component. The thermoplastic elastomer may include a styrenic-based thermoplastic elastomer. Applying heat to the styrenic-based thermoplastic elastomer to maintain the styrenic-based thermoplastic elastomer in a softened state may include heating the styrenic-based thermoplastic elastomer to greater than a glass transition temperature of a styrenic component. The thermoplastic elastomer may have a hardness of less than 15 Shore A. The thermoplastic elastomer may have a Young's modulus of less than 0.25 megapascals.

Positioning one or more of a bobbin and a housing may include positioning the bobbin and the housing such that the bobbin is inside the housing and concentric with the housing. The bobbin and/or the housing may be at a temperature that is in a range from about 100° C. to about 200° C. during the positioning of the bobbin and/or the housing.

In accordance with another aspect, a device includes a compliant member and a housing. The compliant member has a substantially planar shape and formed of a film of a thermoplastic elastomer. The housing has an end that extends at least partially into the compliant member. The thermoplastic elastomer adheres to a portion of the housing at the end of the housing to form a meniscus having a height defined along a wall of the housing.

Examples may include one or more of the following features:

The compliant member may include a meniscus formed at each of an inner wall surface of the housing and an outer wall surface of the housing.

The device may further include a bobbin disposed inside the housing and having an end that extends at least partially into the compliant member. The thermoplastic elastomer adheres to a portion of the bobbin at the end of the bobbin to form a meniscus having a height defined along a wall of the bobbin. The compliant member may further include a meniscus formed at each of an inner wall surface of the housing, an outer wall surface of the housing, an inner wall surface of the bobbin and an outer wall surface of the bobbin.

The housing may be a tube having an opening at the end.

The thermoplastic elastomer may include a thermoplastic vulcanizate or a styrenic-based thermoplastic elastomer. The thermoplastic elastomer may have a hardness of less than 15 Shore A. The thermoplastic elastomer may have a Young's modulus of less than 0.25 megapascals.

In accordance with another aspect, a microspeaker device includes an acoustic diaphragm, a housing, a bobbin and a coil. The acoustic diaphragm has a substantially planar shape and formed of a film of thermoplastic elastomer. The housing has an end extending at least partially into the film of thermoplastic elastomer. The film adheres to a portion of the housing at the end of the housing to form a first meniscus along a portion of a wall of the housing. The bobbin has a bobbin surface and is disposed inside the housing. The bobbin has an end extending at least partially into the film of thermoplastic elastomer. The film adheres to a portion of the bobbin at the end of the bobbin to form a second meniscus along a wall of the bobbin. The coil is wound on the bobbin surface.

Examples may include one or more of the following:

An axis of the housing and an axis of the bobbin may be colinear.

The first meniscus may include a first inner meniscus having a height along an inner wall surface of the housing and a first outer meniscus having a height along an outer wall surface of the housing, and the second meniscus may include a second inner meniscus having a height along an inner wall surface of the bobbin and a second outer meniscus having a height along an outer wall surface of the bobbin.

BRIEF DESCRIPTION OF THE DRAWINGS

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Modern in-ear headphones, or earbuds, typically include microspeakers. The microspeaker may include a coil that is attached to an acoustic diaphragm either directly or through a bobbin on which the coil is wound. Motion of the diaphragm due to an electrical signal provided to the coil results in generation of an acoustic signal that is responsive to the electrical signal. The microspeaker typically includes a housing, such as a sleeve or tube, which encloses the bobbin, coil and a magnetic structure. As the size of the earbud decreases, it becomes increasingly difficult to fabricate the acoustic diaphragm with an elastic suspension at one end of the bobbin (or coil) and housing.

Figure 1A:
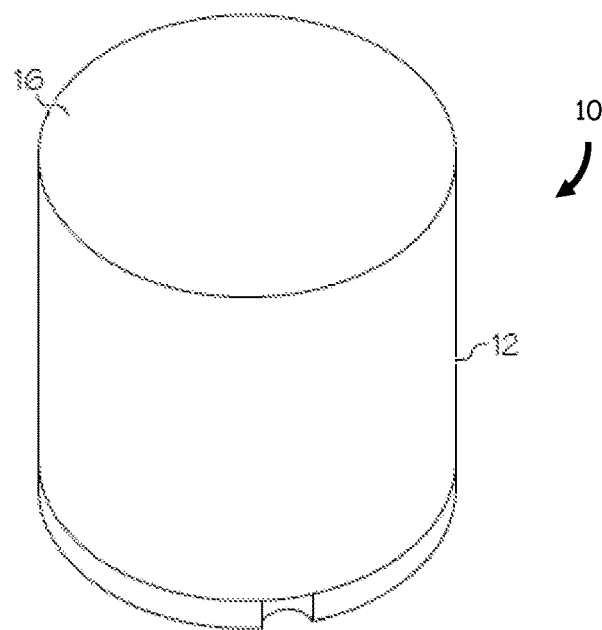
FIG. 1A, FIG. 1B and FIG. 1C are a perspective illustration, a perspective cutaway illustration and an exploded cutaway illustration, respectively, of an example of a microspeaker for a miniature earbud.
Figure 1B:
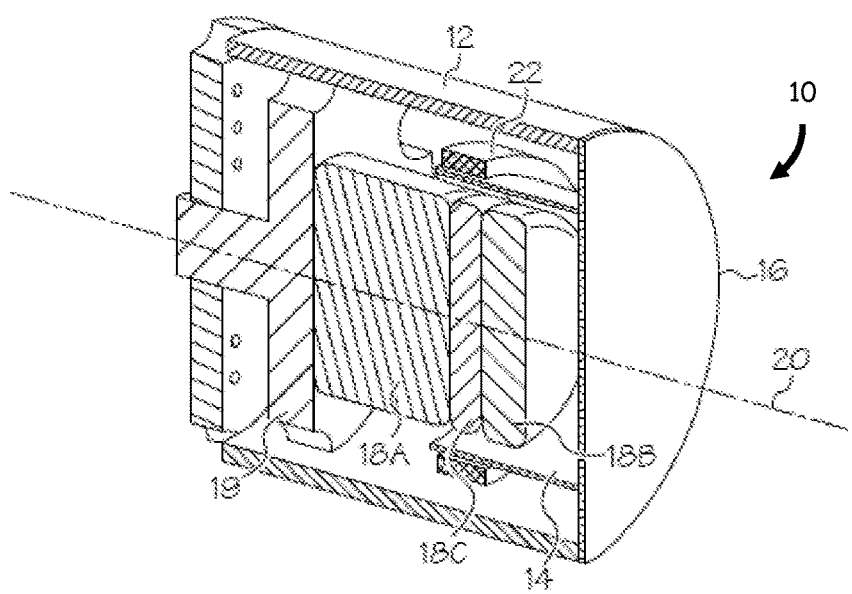
Figure 1C:
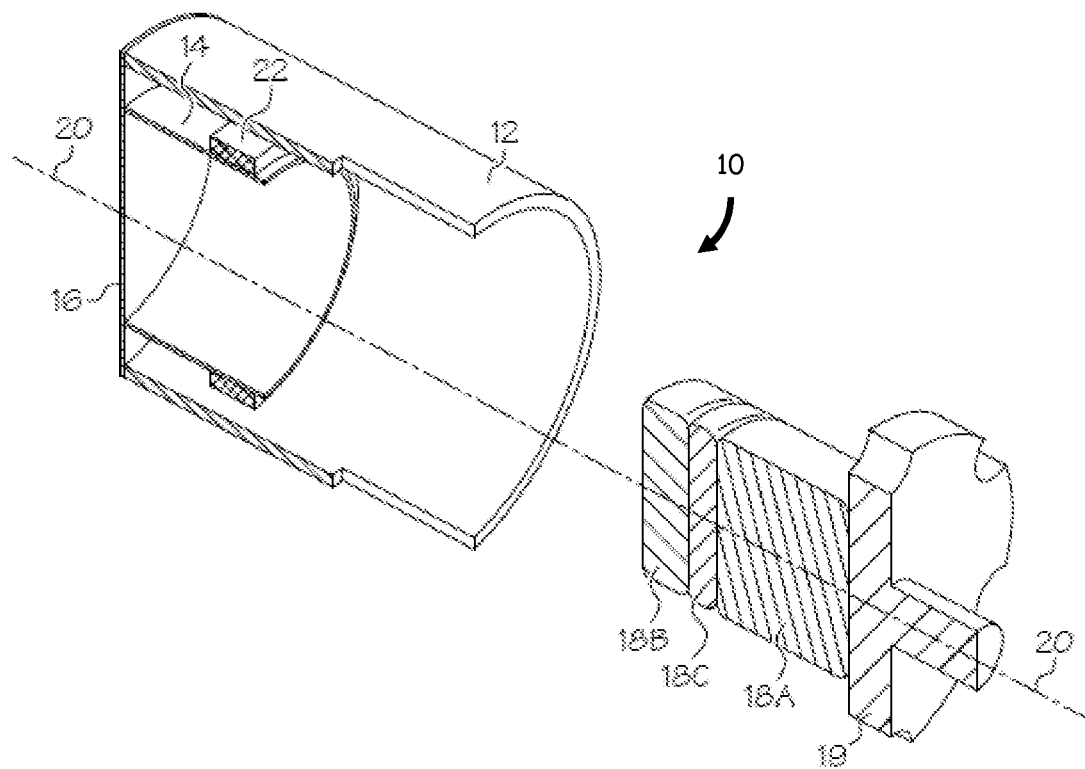

FIG. 1A, FIG. 1B and FIG. 1C are a perspective illustration, a perspective cutaway illustration and an exploded cutaway illustration, respectively, of an example of a microspeaker 10 that can be used in a miniature earbud. The microspeaker 10 includes a cylindrical housing 12 having an opening at both ends. Inside the housing 12 is a bobbin 14 that is nominally cylindrical in shape and which is open at least at one end. The housing 12 and bobbin 14 are secured at one of their ends to a compliant member 16. In some examples, the housing 12 is made of stainless steel and the bobbin 14 is made of a polyimide (e.g., KAPTON) or polyethylene terephthalate (PET) (e.g., MYLAR®). A magnet assembly 18 is secured to a platform 19 at an end of the housing 12 that is opposite to the compliant member 16. The magnet assembly 18 includes two magnet pieces 18A and 18B separated by a coin 18C. The magnet assembly 18 extends along an axis 20 of the housing 12 and into an open region inside the bobbin 14. In one example, the magnet pieces 18A and 18B are cylindrical neodymium magnets. A coil 22 is wound onto an outside surface of the bobbin 14. The bobbin 14 has an axis that is colinear with the housing axis 20. The bobbin 14 moves substantially along the housing axis 20 in response to an electrical current conducted through the coil 22. In turn, a central circular portion of the compliant member 16 moves axially and displaces air to thereby create an acoustic signal.

In one technique for fabricating a compliant member, an open end of a housing and an open end of a bobbin are placed into a single thin layer of liquid silicone rubber. The liquid silicone rubber is then cured to form the compliant member. The central region of the compliant member that is located within the end region of the bobbin can be stiffened while the annular region that surrounds the central region remains compliant. Difficulties arise with this technique as the liquid silicone has a surface tension that causes the liquid to adhere to and "climb up" the walls of the housing and the bobbin to form menisci. The migration of the liquid silicone along the walls can occur quickly, for example, within a few seconds of placing the ends of the housing and bobbin into the liquid silicone rubber. The result of the migration is a reduction in the thickness of the cured layer of silicone which can lead to holes in the compliant member. Holes can form during the demolding process because the compliant member is weakened at the thinned areas. In addition, thinned areas may result in holes being formed in the compliant member or tearing of the compliant member during operation of the microspeaker.

One method for fabricating the compliant member is described in U.S. patent application Ser. No. 15/182,069, filed Jun. 14, 2016, the disclosure of which is incorporated herein by reference in its entirety. According to the method, which is based on a two-pass silicone film casting process, a second elastomeric layer is applied to a thicker and at least partially cured first elastomeric layer. This method results in a reduction of the thinning of the full elastomeric layer. A corresponding reduction in the formation of holes during demolding and tearing during microspeaker operation is achieved.

According to another method for fabricating the compliant member, as described in U.S. patent application Ser. No. 15/598,065, filed May 17, 2017, the disclosure of which is incorporated herein by reference in its entirety, a single pass elastomeric layer casting process is employed. In this method, the viscosity of the layer is controlled during fabrication by appropriate application of heat or ultraviolet (UV) light in a manner that limits the migration of the liquid silicone along the walls of the housing and bobbin, and the height of the resulting menisci formed along the walls. Consequently, occurrences of hole formation and tearing may be further reduced.

The above referenced methods have associated challenges, including cost, complexity and material availability. For example, control of the viscosity of the elastomeric materials during the fabrication processes using heat or UV light can be difficult. In addition, silicones or other soft thermoset elastomers such as polyurethanes can be expensive and may not be commercially available. Furthermore, various elastomeric materials may have limited shelf-life (e.g., a few months); requiring repurchase of the material while an unused portion of a prior purchase amount may have expired. Moreover, the time needed to complete the fabrication process can be extensive. For example, the thermoset elastomeric material may require extended curing times (e.g., two hours or more).

In examples described herein for a method of fabricating a device having a compliant member, heat is applied to a thermoplastic elastomeric material to change the material to a softened state and/or maintain the material in a softened state. As used herein, a "softened state" means that the material is easily shaped through the application of heat and/or pressure. When in a softened state, the material is above its glass transition ($T_g$) and may exhibit behavior similar to that of a molten material. The softened material is extruded into a film, and a bobbin and/or housing are positioned such that their ends extend at least partially into the film. The positioning may occur while the film of thermoplastic elastomer is in the softened state. Alternatively, the bobbin and/or housing may be heated to a temperature that is greater than the temperature of the film before the bobbin and/or housing are positioned in the film. The film with the bobbin and/or housing is cooled so that the thermoplastic elastomer is no longer softened but instead is in a "rubber state" in which the thermoplastic elastomer exhibits rubber-like properties. During the transition from the softened state to the rubber state, the bobbin and/or housing is secured to the film.

Thermoplastic elastomers combine elastomeric properties with advantages of thermoplastics and can typically be processed and shaped using techniques similar to those used for thermoplastics. In some instances, thermoplastic elastomers are block copolymers with elastomers and can be used as a replacement for vulcanized rubbers. Advantageously, thermoplastic elastomers have inherently high viscosity and, unlike techniques utilizing other types of elastomeric materials for forming compliant members, no extended heating period is necessary for curing. Instead, the application of heat is limited to that appropriate to cause the material to flow as thermoplastic elastomers generally have higher melt viscosities than thermoset rubbers.

Some thermoplastic elastomers having a hardness from about 15 Shore A to about 90 Shore A and therefore may be too stiff for obtaining a sufficiently compliant member; however, other thermoplastic elastomers, such as oil extended thermoplastic elastomers, can be used. For example, thermoplastic elastomers having a hardness of less than 15 Shore A and/or a Young's modulus of less than 0.25 MPa can be used.

By way of example, the thermoplastic elastomer may be a thermoplastic vulcanizate (TPV) such as Sarlink® from Teknor Apex Company, Pawtucket, R.I. In an alternative example, the thermoplastic elastomer may be a styrenic-based thermoplastic elastomer such as Medalist® MD-16120G or Medalist® MD-447 from Teknor Apex. In another example, the thermoplastic elastomer may be a derivative, such as an α-methyl styrene-based thermoplastic elastomer.

Figure 2:
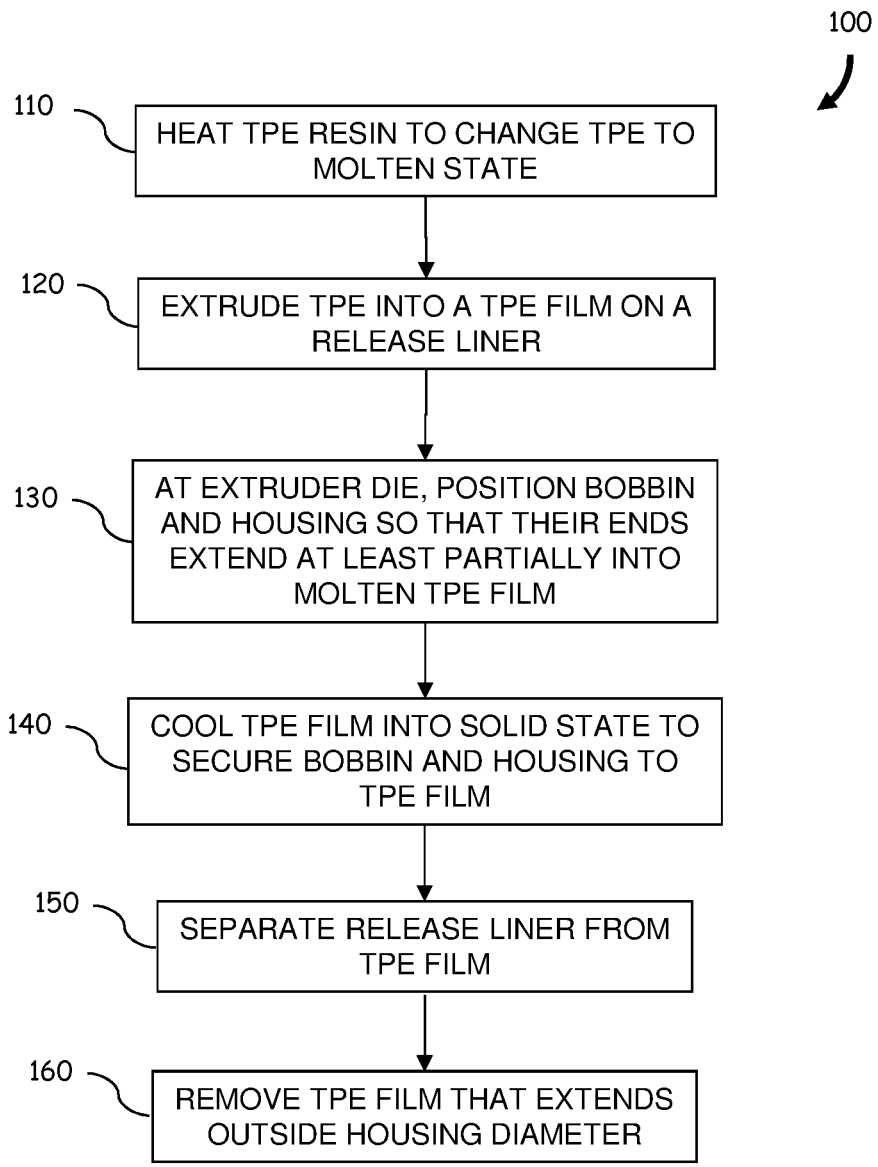
FIG. 2 is a flowchart representation of an example of a method 100 of fabricating a device having a compliant member.
Figure 3A:
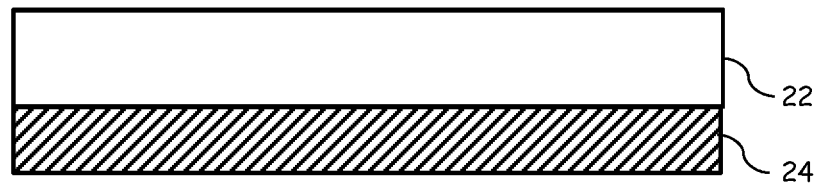
FIG. 3A is a cross-sectional side view of an example of a thermoplastic elastomer film on a release liner.
Figure 3B:
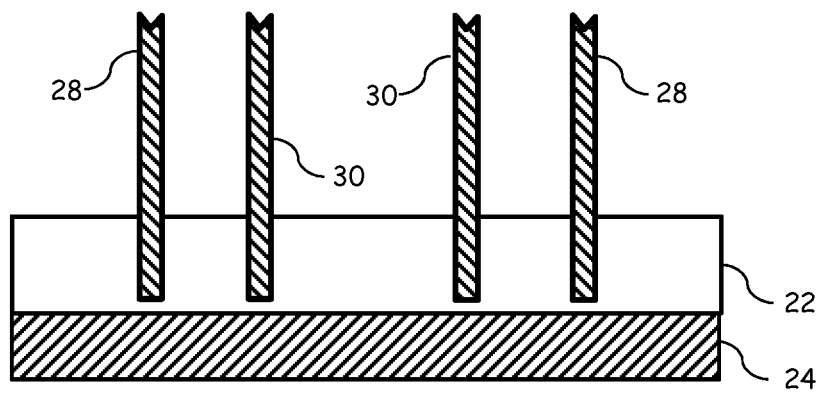
FIG. 3B shows end portions of a housing and a bobbin extending into a thermoplastic elastomer film.
Figure 3C:
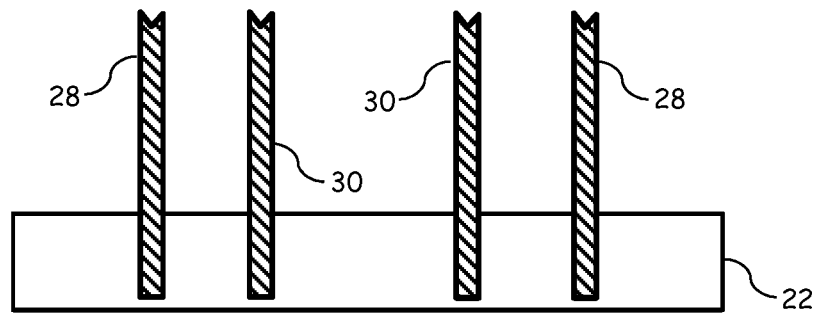
FIG. 3C shows the thermoplastic elastomer film of FIG. 4B that remains as a substantially planar compliant member after the release liner is removed.

FIG. 2 is a flowchart representation of an example of a method 100 of fabricating a device having a compliant member. Reference is also made to FIGS. 3A to 3C which are cross-sectional side view illustrations showing, in a sequential manner, the method 100 as applied to fabrication of a microspeaker device in which the compliant member can subsequently be processed to form an acoustic diaphragm and a surround.

According to the method 100, heat is applied (110) to a thermoplastic elastomer (TPE) to achieve and maintain the thermoplastic elastomer in a softened state. If a styrenic-based thermoplastic elastomer is used, the heat applied is sufficient to heat the thermoplastic elastomer greater than the glass transition temperature $T_g$ of the styrenic component (e.g., greater than 100° C.) at which the material begins to soften. If a thermoplastic vulcanizate is used, the applied heat is sufficient to heat the material to a temperature greater than the crystalline melting temperature $T_m$ of the polypropylene component (e.g., greater than 160° C.).

Figure 4:
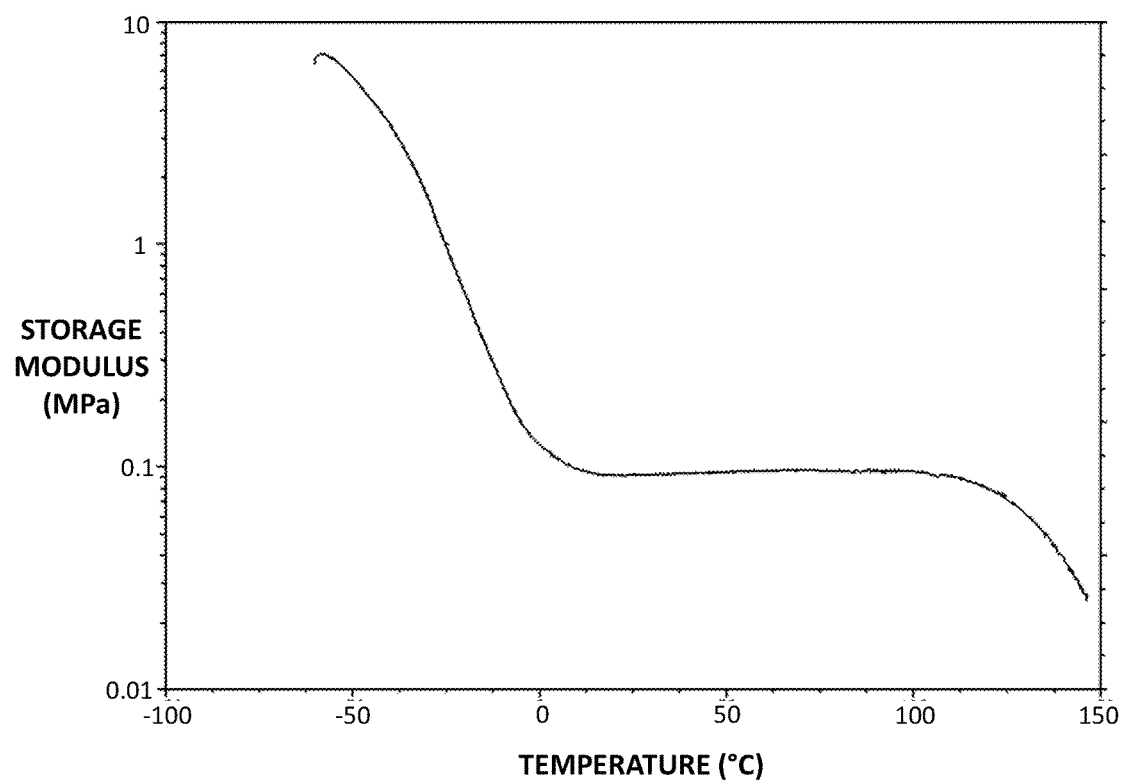
FIG. 4 is a graphical representation of how the storage modulus of an example of a thermoplastic elastomer material varies as a function of temperature.

Reference is also made to FIG. 4 which shows the storage modulus of an example thermoplastic elastomer material (Medalist® MD-447 medical elastomer) as a function of temperature. The material has a substantially constant storage modulus value from below room temperature to greater than 100° C. At higher temperatures, the storage modulus decreases and the material transitions from a rubber state to a softened state with increasing temperature. The thermoplastic elastomer is extruded (120) to form a sheet or film on a release liner. For example, the thermoplastic material corresponding to FIG. 4 may be at a temperature of approximately 125° C. or greater during extrusion.

FIG. 3A is an example cross-sectional side view of a thermoplastic elastomer film 22 on a release liner 24. The thermoplastic elastomer material may be provided as a granulate (e.g., pellets) and fed by an extrusion screw under application of heat (e.g., increase temperature of thermoplastic elastomer material to between 190° C. and 200° C.). The softened thermoplastic elastomer is extruded through a die onto the release liner 24. A housing and bobbin are then positioned (130) on the film 22 so that one end of each extends at least partially into the film 22. For example, FIG. 3B shows a housing 28 and bobbin 30 (only end portions illustrated) with their ends extending at least partially into the thermoplastic elastomer film 22. In one example, the housing 28 is in the form of a hollow cylindrical tube and the bobbin 30 is configured to move in a bi-directional manner along the tube axis. The housing 28 and bobbin 30 may be positioned at the same time. Alternatively, the housing 28 and bobbin 30 may be positioned at different times as long as the thermoplastic elastomer film 22 is in a softened state. Due to the inherently higher viscosity of a thermoplastic elastomer in a softened state relative to an uncured elastomeric material, the migration of the thermoplastic elastomer is substantially reduced relative that of the uncured elastomeric material. The reduction in material migration results in smaller menisci formed along the walls of the housing 28 and bobbin 30 as described further below. The thermoplastic elastomer film 22 with the embedded housing 28 and bobbin 30 is then cooled (140) so that the film 22 transitions to a rubber state and the housing 28 and bobbin 30 are secured to the film 22. Passive cooling may be used. Alternatively, active cooling can be employed to decrease the manufacturing time.

The release liner 24 is removed (150) so that the thermoplastic elastomer film 22 remains as a substantially planar compliant member that adheres to the end of the housing 28 and the bobbin 30 as shown in FIG. 3C. The central region of the compliant member, (i.e., the area defined within the diameter of the bobbin 30) can be stiffened to form the acoustic diaphragm. The annular area surrounding the central region defines a compliant surround that can support the bobbin 30 and coil, and enables the acoustic diaphragm to move axially to thereby generate an acoustic signal. The portion of the compliant member that extends beyond the outer diameter of the housing 28 may be removed (160) by any of a variety of techniques such as by trimming or using a punch tool.

Figure 5:
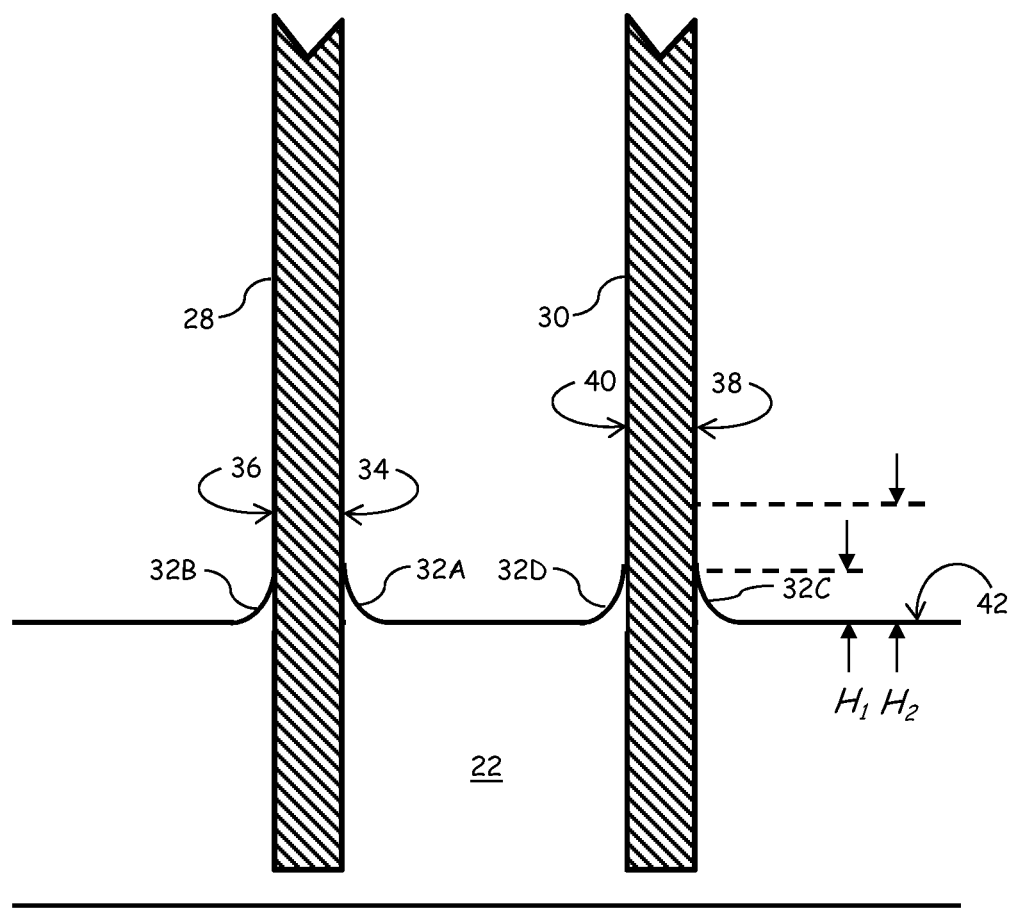
FIG. 5 shows a magnified cross-sectional view of a portion of the ends of the housing and bobbin corresponding to the left side of FIG. 3C.

FIG. 5 shows a magnified cross-sectional view of a portion of the ends of the housing 28 and bobbin 30 corresponding to the left side of FIG. 3C. A meniscus 32 is formed at locations where the thermoplastic elastomer film material has climbed (vertical migration in the figure) the walls of the housing 28 and bobbin 30. Thus, there is an inner meniscus 32A and an outer meniscus 32B along an inner wall surface 34 and an outer wall surface 36, respectively, of the housing 28. Similarly, there is an inner meniscus 32C and an outer meniscus 32D along an inner wall surface 38 and an outer wall surface 40, respectively, of the bobbin 30. Each meniscus 32 has a height $H_1$ defined from the top surface 42 of the thermoplastic elastomer film 22. The menisci 32 are formed during a period starting when the ends of the housing 28 and bobbin 30 are first positioned in the softened thermoplastic elastomer film 22. All menisci 32 are shown as having the same height $H_1$; however, the heights along the two walls may differ due to a difference in material migration along the walls according to differences in the wall materials. The bottoms of the walls are not coincident with the bottom of the thermoplastic elastomer film 22 as there is some affinity between the thermoplastic elastomer material and the wall regardless of the viscosity of the thermoplastic elastomer while in the softened state.

Due to the higher viscosity of the thermoplastic elastomer film 22 and the corresponding reduction in material migration, the height $H_1$ of the menisci 32 is substantially less than a height $H_2$ of the menisci that otherwise would have formed using an uncured elastomeric layer. As a result, less thinning occurs and there is a substantial reduction in thickness variations across the thermoplastic elastomer film 22. Advantageously, the fabricated device is easier to remove from the release liner (not shown) without tearing or generating holes. Moreover, the opportunity for holes or tears to be generated during operation of a microspeaker device fabricated with the compliant member is reduced or eliminated. An additional advantage is a more consistent stiffness of the suspension defined by the peripheral portion of the compliant member that surrounds the inner acoustic diaphragm.

It should be noted that the elimination of the menisci 32 is not a goal as they represent an increased area of adherence to the walls of the housing 28 and bobbin 30, and tearing can occur when the release liner is removed if no menisci are present. In addition, the menisci 32 limit the stress concentration at the joint between the elastomer and the housing and bobbin walls.

Reference is again made to U.S. patent application Ser. No. 15/182,069 which discloses a two-pass film casting process for forming the compliant member in which a second elastomeric layer is applied to a thicker and at least partially cured first elastomeric layer. The process achieves advantages over methods based on a single elastomeric layer; however, the methods described herein using a thermoplastic elastomer achieve additional advantages over the two-pass film casting technique due in part to the use of processes that can be implemented with standard plastics processing equipment and readily-available materials. Moreover, a lower cost is realized by avoidance of curing processes and the related equipment costs, labor costs and manufacturing delay. A further advantage of the examples of methods described herein includes low surface tack which eliminates the need for a specialized coating on the release liner to facilitate separation from the thermoplastic elastomer film. Moreover, in contrast to thermoset elastomers, thermoplastic elastomer materials generally are not subject to short expiration periods during which the materials must be used.

Figure 6:
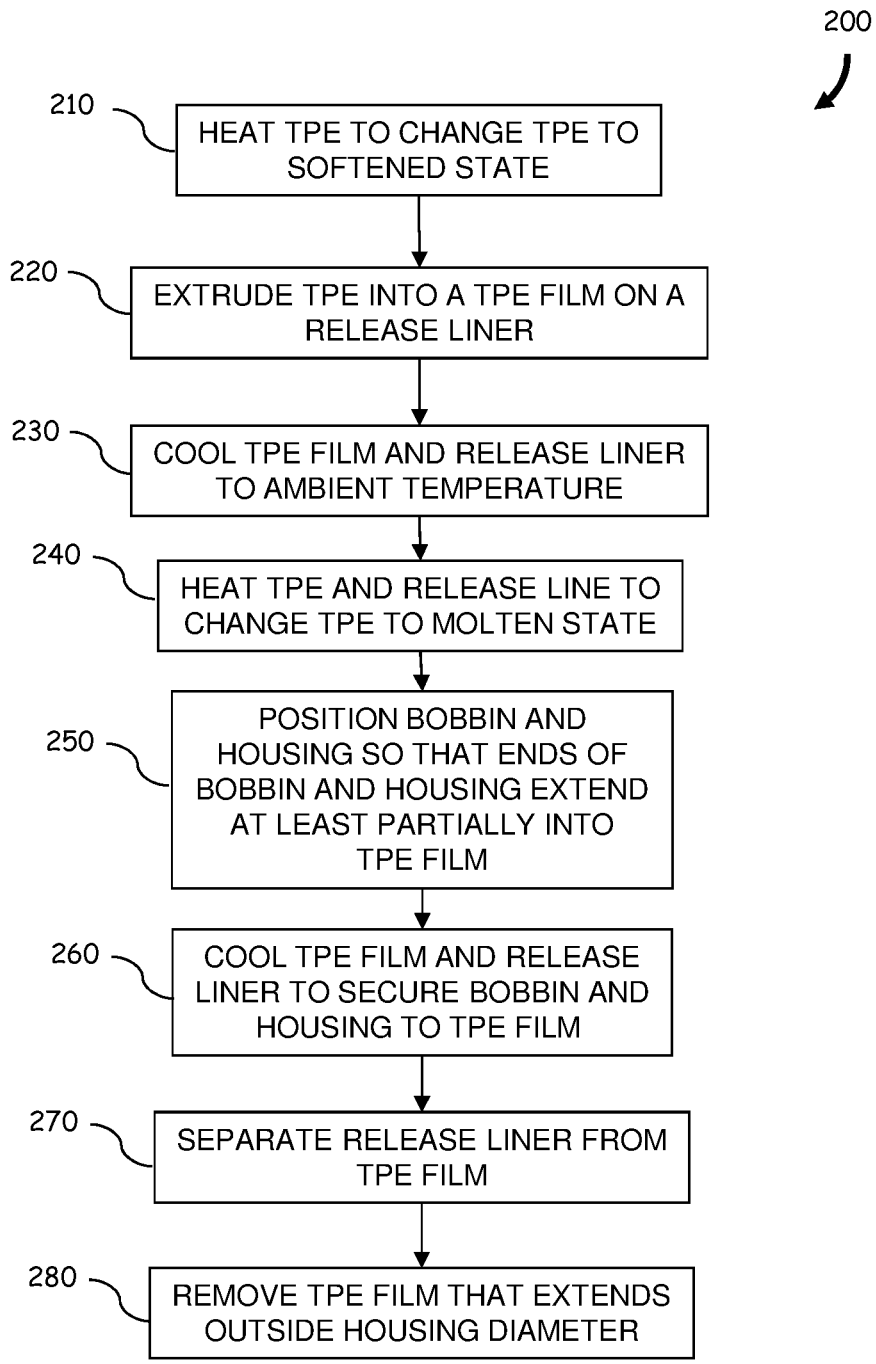
FIG. 6 is a flowchart representation of another example of a method of fabricating a device having a compliant member.

FIG. 6 is a flowchart representation of an alternative example of a method 200 of fabricating a device having a compliant member. According to the method 200, heat is applied (210) to a thermoplastic elastomer to achieve and maintain the thermoplastic elastomer in a softened state. The thermoplastic elastomer is extruded (220) to form a sheet or film on a release liner. The thermoplastic elastomer film and release liner are cooled (230) (e.g., passively cooled to ambient temperature) so that the thermoplastic elastomer film transitions to a rubber state. Optionally, the thermoplastic elastomer film and release liner may be wound on a roll or packaged in another configuration for convenient transport in a situation where subsequent fabrication is to occur at a different location. The thermoplastic elastomer film and release liner are heated (240) so that the thermoplastic elastomer changes to a softened state and the bobbin and housing are then positioned (250) in the softened thermoplastic elastomer film. Subsequently, the thermoplastic elastomer film, release liner, bobbin and housing are cooled (260) to thereby return the film to a rubber state and secure the bobbin and housing to the film. The release liner is then separated (270) from the thermoplastic elastomer film and the excess film, that is, the film that extends beyond the diameter of the housing, is removed (280).

In one specific example, steps 210 through 230 are performed at one facility where extrusion equipment is located and the resulting thermoplastic elastomer film and release liner are shipped to a different location where the remaining method steps are performed.

Figure 7:
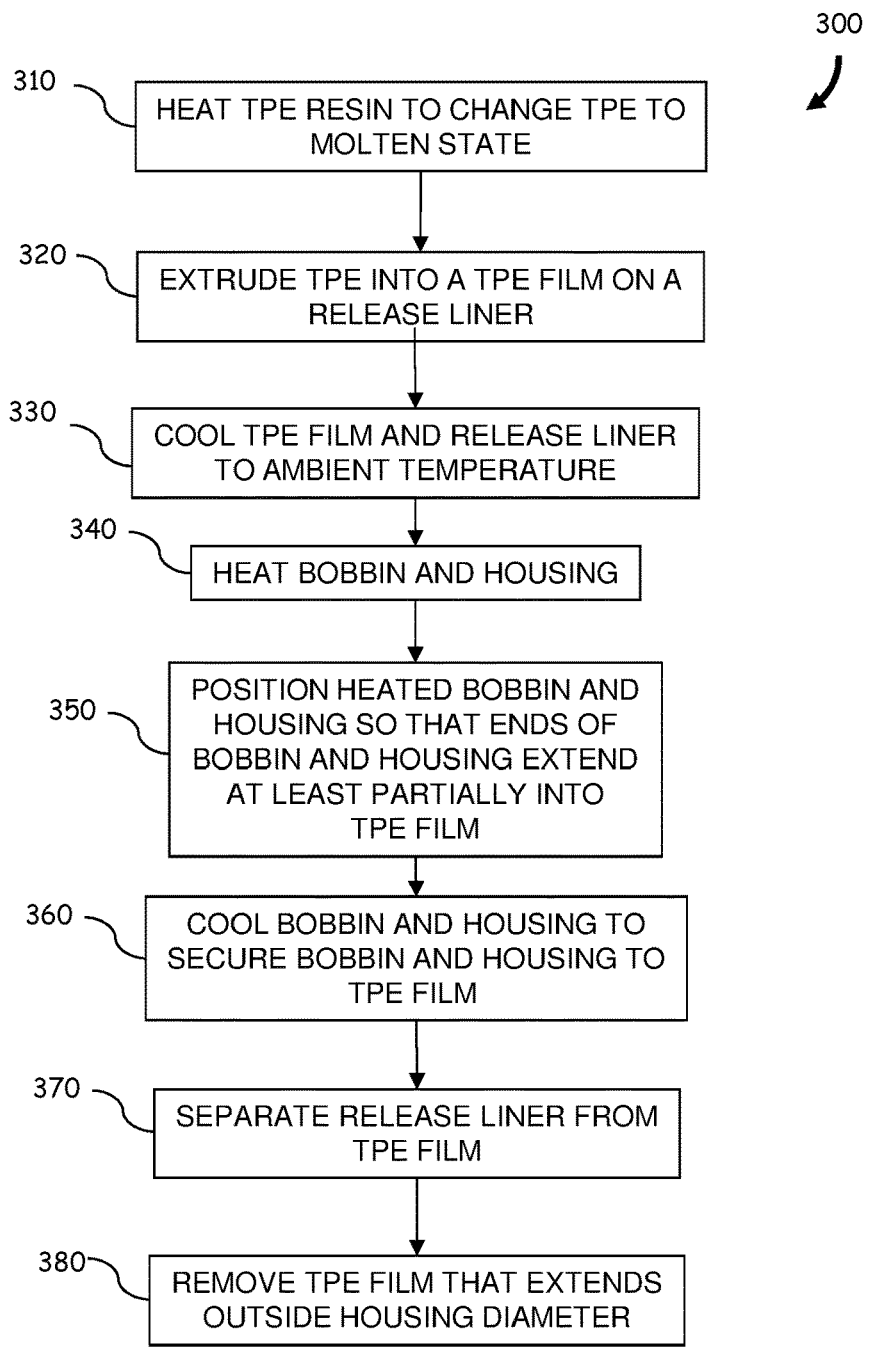
FIG. 7 is a flowchart representation of another example of a method of fabricating a device having a compliant member.

FIG. 7 is a flowchart representation of another example of a method 300 of fabricating a device having a compliant member. Similar to the examples described above, heat is applied (310) to change a thermoplastic elastomer to a softened state and the softened material is extruded (320) to form a film on a release liner. The thermoplastic elastomer film and release liner are cooled (330) so that the thermoplastic elastomer film transitions to a rubber state. Unlike the prior method examples, the bobbin and housing are heated (340) to a temperature substantially greater than the temperature of the thermoplastic elastomer film before being positioned (350) in the film. For example, the bobbin and housing may be heated to a temperature between approximately 190° C. and 210° C. The temperatures of the bobbin and housing are sufficiently high such that the thermoplastic material in contact with and near to the bobbin and housing changes to a softened state due to conduction of thermal energy from the heated parts. Consequently, the bobbin and housing extend at least partially into the film. The bobbin and housing are then cooled (360), either actively or passively, to secure them to the film. Subsequently, the release liner is separated (370) from the film and the film extending beyond the outer diameter of the housing is removed (380).

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A method of fabricating a device having a compliant member, comprising:
   applying heat to a thermoplastic elastomer to maintain the thermoplastic elastomer in a softened state;
   extruding the thermoplastic elastomer in the softened state into a film of thermoplastic elastomer;
   positioning one or more of a bobbin and a housing, each having an end, such that the end of the bobbin and/or housing extends at least partially into the film of thermoplastic elastomer, the positioning occurring when the thermoplastic elastomer is in the softened state and/or the bobbin and/or housing is at a temperature that is greater than a temperature of the film of thermoplastic elastomer; and
   cooling the film of thermoplastic elastomer having the bobbin and/or housing positioned therein, wherein the bobbin and/or housing is thereby secured to the film of thermoplastic elastomer.

2. The method of claim 1 wherein extruding the thermoplastic elastomer comprises extruding the thermoplastic elastomer as a film on a release liner.

3. The method of claim 2 further comprising removing the release liner from the film of thermoplastic elastomer subsequent to the cooling of the film of thermoplastic elastomer.

4. The method of claim 1 wherein the film of thermoplastic elastomer is cooled into a rubber state, the method further comprising applying heat to the film of thermoplastic elastomer in the rubber state to change the film of thermoplastic elastomer into the softened state prior to the positioning of the housing.

5. The method of claim 1 wherein the temperature of the film of thermoplastic elastomer is at an ambient temperature when the housing is at a temperature that is greater than the temperature of the film of thermoplastic elastomer.

6. The method of claim 1 further comprising removing a portion of the film of thermoplastic elastomer that extends outside a diameter of the housing after cooling the film of thermoplastic elastomer.

7. The method of claim 1 wherein the thermoplastic elastomer comprises a thermoplastic vulcanizate.

8. The method of claim 7 wherein applying heat to the thermoplastic vulcanizate to maintain the thermoplastic vulcanizate in a softened state comprises heating the thermoplastic vulcanizate to greater than a crystalline melting temperature of a polypropylene component.

9. The method of claim 1 wherein the thermoplastic elastomer comprises a styrenic-based thermoplastic elastomer.

10. The method of claim 9 wherein applying heat to the styrenic-based thermoplastic elastomer to maintain the styrenic-based thermoplastic elastomer in a softened state comprises heating the styrenic-based thermoplastic elastomer to greater than a glass transition temperature of a styrenic component.

11. The method of claim 1 wherein the thermoplastic elastomer has a hardness of less than 15 Shore A.

12. The method of claim 1 wherein the thermoplastic elastomer has a Young's modulus of less than 0.25 megapascals.

13. The method of claim 1 wherein positioning one or more of a bobbin and a housing comprises positioning the bobbin and the housing such that the bobbin is inside the housing and concentric with the housing.

14. The method of claim 1 wherein the bobbin and/or the housing is at a temperature that is in a range from about 100° C. to about 200° C. during the positioning of the bobbin and/or the housing.

15. A device comprising:
a compliant member having a substantially planar shape and formed of a film of a thermoplastic elastomer; and
a housing having an end that extends at least partially into the compliant member, wherein the thermoplastic elastomer adheres to a portion of the housing at the end of the housing to form a meniscus having a height defined along a wall of the housing, wherein the meniscus is formed at each of an inner wall surface of the housing and an outer wall surface of the housing.

16. The device of claim 15 further comprising a bobbin disposed inside the housing and having an end that extends at least partially into the compliant member, wherein the thermoplastic elastomer adheres to a portion of the bobbin at the end of the bobbin to form a meniscus having a height defined along a wall of the bobbin.

17. The device of claim 16 wherein the compliant member further includes a meniscus formed at an inner wall surface of the bobbin and an outer wall surface of the bobbin.

18. The device of claim 15 wherein the housing is a tube having an opening at the end.

19. The device of claim 15 wherein the thermoplastic elastomer comprises a thermoplastic vulcanizate.

20. The device of claim 15 wherein the thermoplastic elastomer comprises a styrenic-based thermoplastic elastomer.

21. The device of claim 15 wherein the thermoplastic elastomer has a hardness of less than 15 Shore A.

22. The device of claim 15 wherein the thermoplastic elastomer has a Young's modulus of less than 0.25 megapascals.

* * * * *